United States Patent [19]
Howe

[11] 3,797,336
[45] Mar. 19, 1974

[54] QUICK CONNECT NUT

[76] Inventor: Wilson S. Howe, 1935 Spruce Ave., Longmont, Colo. 80501

[22] Filed: Dec. 6, 1971

[21] Appl. No.: 204,977

Related U.S. Application Data

[63] Continuation-in-part of Ser. No. 15,613, March 2, 1970, Pat. No. 3,695,139.

[52] U.S. Cl............................ 81/125, 81/53 R, 85/33
[51] Int. Cl............................................. B25b 13/02
[58] Field of Search .......... 85/33; 151/19 R; 81/53, 81/64, 125; 254/29 A; 29/235, 240, 280

[56] References Cited
UNITED STATES PATENTS

| | | | |
|---|---|---|---|
| 148,646 | 3/1874 | Atwood | 151/19 R |
| 2,294,745 | 9/1942 | Goetz | 85/33 |
| 2,664,021 | 12/1953 | Clayson | 81/64 |
| 3,334,536 | 8/1967 | Armstrong | 85/33 |
| 3,564,697 | 2/1971 | Shalaty et al. | 29/280 |

Primary Examiner—Edward C. Allen
Attorney, Agent, or Firm—Van Valkenburgh, Lowe & Law

[57] ABSTRACT

A segmented, quick connect nut held together by a resilient ring. The segments spread apart to slip over a threaded bolt or stud. The base of the nut is conical and is mounted against an associated washer having a conical seat to receive the base and jam the segments together whenever the nut is tightened upon the bolt. The nut has a conical cavity at the head end, opposite the base, and the conical seat of a holding tool engages this cavity to facilitate spreading the segments whenever the nut is being threaded into position upon the bolt. A removal tool spreads the segments to remove the nut from the bolt once it is loosened from its seat in its associated washer.

3 Claims, 22 Drawing Figures

3,797,336
Patented Mar 19 1974
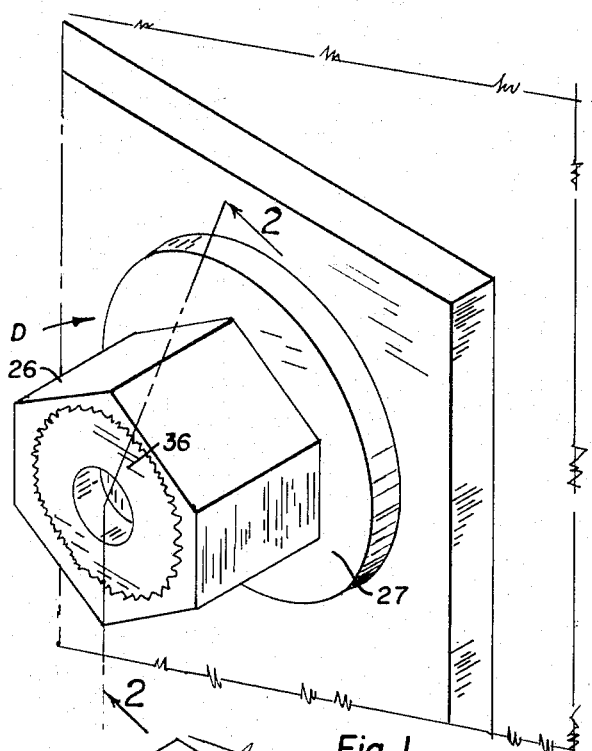
Fig. 1
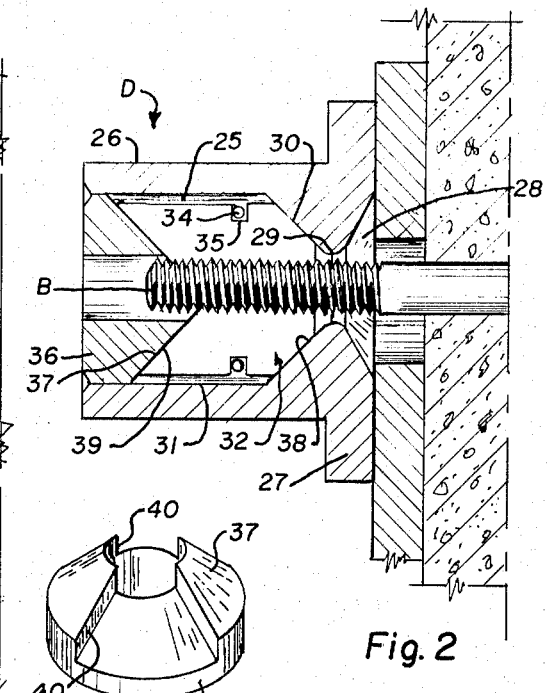
Fig. 2
Fig. 3
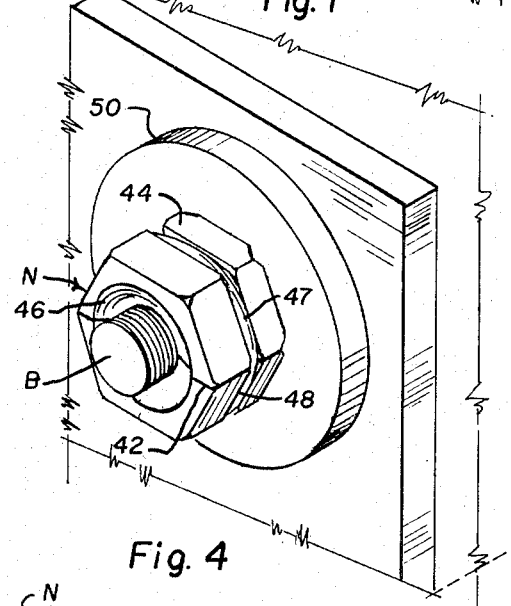
Fig. 4
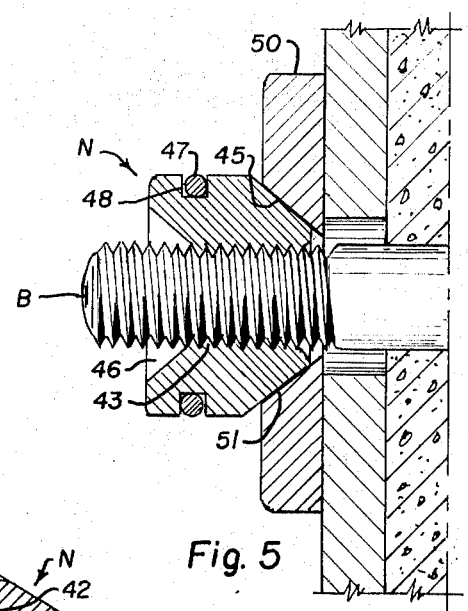
Fig. 5
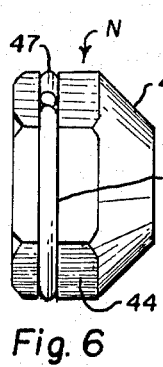
Fig. 6
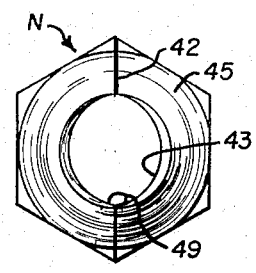
Fig. 7
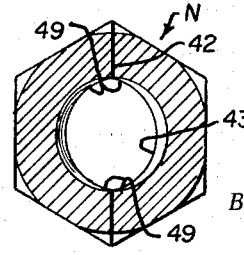
Fig. 8
INVENTOR.
Wilson S. Howe
BY
Van Valkenburgh Lowe
ATTORNEY

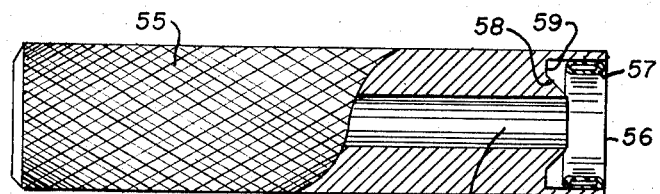
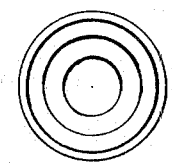
Fig. 9  Fig. 10
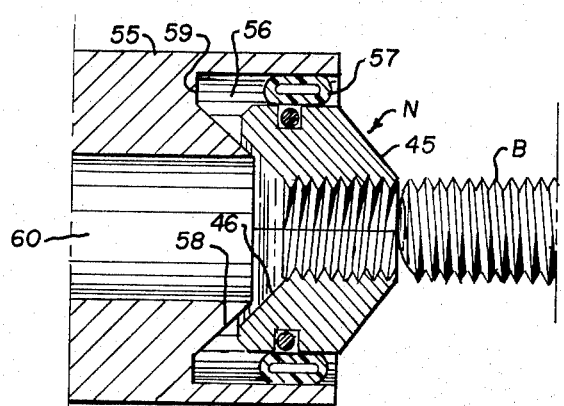
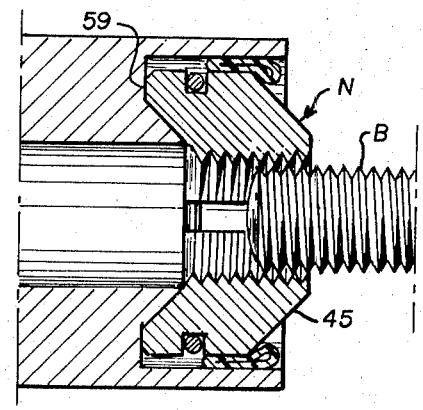
Fig. 11  Fig. 12
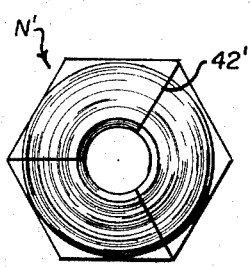
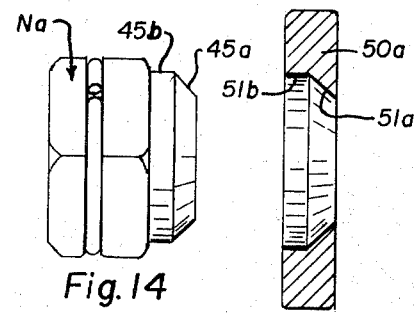
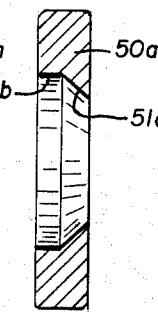
Fig. 13  Fig. 14  Fig. 15
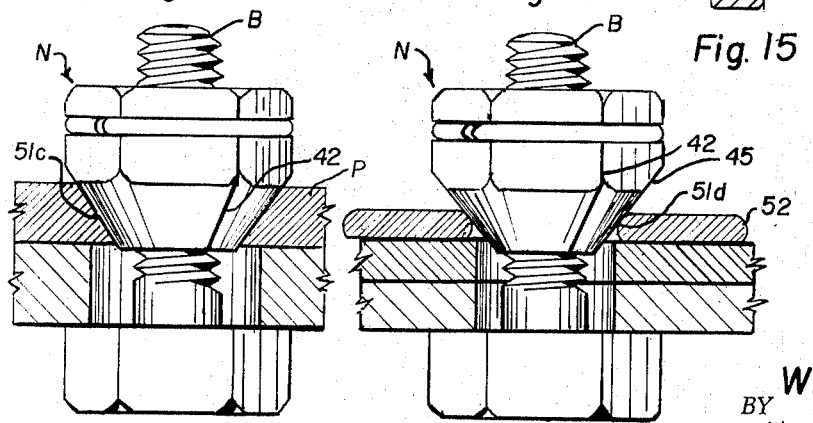
Fig. 16  Fig. 17

INVENTOR.
Wilson S. Howe
BY Von Valkenburgh & Lowe
ATTORNEY

QUICK CONNECT NUT

This invention is a continuation-in-part of, and is related to my application for a quick connect coupler, filed Mar. 2, 1970, Ser. No. 15,613, now patent 3,695,139, the present invention disclosing subject matter in that application, and disclosing new related subject matter and claiming the same.

This invention relates to quick connecting couplers, and more particularly to a quick connecting nut for threaded bolts and studs. As such, the invention will be called a quick-connect nut.

There is a need, especially in the construction industry, for couplers and nuts which can quickly and easily interconnect two members and then, perhaps later, tightly secure them together. Various types of quick-connect couplers have been proposed for a number of uses, but none have generally replaced or supplanted bolts and nuts, simply because bolts and nuts are cheap, and can provide strong and secure connections. Also, they can be tightened or loosened as desired. Thus, even though an attachment by a bolt and nut is slow when a premium is placed upon a workman's time, other types of connectors are usually not as satisfactory.

The present invention was conceived and developed with the above factors in view and comprises, in essence, a segmented nut and also, a holding tool and a retaining washer which are needed in applying the nut. The nut is adapted to be connected to a bolt or stud by the simple expedient of thrusting the nut upon the bolt. The holding tool and the retaining washer physically cooperate with the nut, the tool by holding the nut when the segments are spread apart in thrusting it upon a bolt shank, and the washer by securing the nut in position. The nut, once in position, is tightly secured by a partial turn, or a few turns at most, as with a wrench in a conventional manner. In removing the nut, it is first released as by turning it a few turns with a wrench and thereafter, it may be quickly removed from the bolt shank by spreading the segments with a segment separator tool and then removed from the bolt or stud.

If follows that an object of the invention is to provide a novel and improved quick-connect nut which can be quickly thrust upon the threaded end or shank of a bolt, or stud, without the need for turning it onto the bolt, and which can be used with bolts having bruised and rusted threads.

Another object of the invention is to provide a novel and improved quick-connect nut and washer which can be thrust onto a bolt and then be securely tightened by a few turns as with a wrench.

Another object of the invention is to provide a novel and improved quick-connect nut which is extremely versatile in the manner in which it can be used.

Another object of the invention is to provide a novel and improved quick-connect nut having segmented components in combination with a restraining washer which can easily be designed to hold as much as a conventional, high-strength nut.

Another object of the invention is to provide a novel and improved quick-connect nut having a simple, compact structural arrangement which permits it to be easily manufactured with conventional machinery.

Other objects of the invention are to provide a novel and improved quick-connect coupler, or nut, which is a neat appearing, simple, economical, reliable, rugged and durable unit.

With the foregoing and other objects in view, as will hereinafter appear, my present invention comprises certain constructions, combinations and arrangements of parts and elements as hereinafter described, defined in the appended claims and illustrated in preferred embodiment in the accompanying drawings in which:

FIG. 1 is an isometric view of a drive nut for fastening a structural member onto a threaded stud projecting from a wall, illustrative of a portion of the disclosure set forth in my copending application, being the same as FIG. 7 of that application.

FIG. 2 is a longitudinal, sectional view of the drive nut shown at FIG. 1, as taken from the indicated line 2—2 at FIG. 1, and this figure is the same as FIG. 8 in my co-pending application.

FIG. 3 is an isometric view of one of the components in the unit shown at FIG. 2, to better exemplify its construction, and this figure is the same as FIG. 9 in my co-pending application.

FIG. 4 is an isometric view, similar to FIG. 1, but showing a preferred embodiment of the quick connect nut constituting the improvement disclosed herein mounted upon a wall stud to hold a member thereon.

FIG. 5 is a longitudinal sectional view of the quick connect nut, stud and other members as shown at FIG. 4.

FIG. 6 is a side view of the nut, per se.

FIG. 7 is an end view, looking towards the base end thereof of the nut, as from the indicated arrow 7 at FIG. 6.

FIG. 8 is a transverse sectional view of the nut shown at FIG. 6.

FIG. 9 is a side view of a tool for holding the nut shown at FIGS. 6, 7 and 8, but on a reduced scale, and with portions broken away and in section to show parts otherwise hidden from view.

FIG. 10 is an end view of the holding tool shown at FIG. 9.

FIG. 11 is a fragmentary sectional detail, on an enlarged scale, of the end of the holding tool having a nut placed therein for thrusting upon the shank of a bolt which is also shown adjacent to the nut.

FIG. 12 is a fragmentary sectional detail similar to FIG. 11, but showing the nut as being partially thrust upon the bolt.

FIG. 13 is an end view of a nut, similar to the showing at FIG. 7, but illustrating a modified form thereof.

FIG. 14 is a side view of a nut, similar to the showing at FIG. 6, but illustrating a modified embodiment thereof.

FIG. 15 is a transverse sectional view of a washer to be used with the nut shown at FIG. 14.

FIG. 16 shows the nut of FIG. 6 holding two plates together wherein one plate is countersunk to obviate the need of a washer.

FIG. 17 shows the nut of FIG. 6 holding two members together but modified by using a conventional, cut washer.

Figure 18:
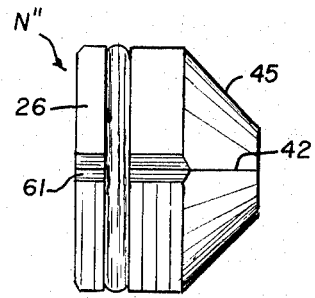
FIG. 18 is a side view of a nut, similar to the showing at FIG. 6, but illustrating a second, modified embodiment thereof which permits the nut segments to be spread apart by a tool for removal from a bolt.

Referring more particularly to the drawing, FIGS. 1, 2 and 3 illustrate a drive nut D shown in my co-pending application at FIGS. 7, 8 and 9. This drive nut D may be fastened to the shank of a bolt B which may be a stud outstanding from the face of a wall structure W with the bolt securing a plate thereto, the bolt extending through a hole in the plate.

This body drive nut D is formed as a cylindrical member having a chamber 25 and a hexagonal outer wall 26. Preferably, a circular flange 27 is located in the face of the drive nut and closes the end of the chamber, except for an axially centered passageway to receive the bolt. The entrance of the passageway at this face is formed as a conical socket 28 which reduces in diameter to a centered orifice 29 wherethrough the shank of the bolt B may pass when the drive nut is thrust upon it, the socket 28 guiding the bolt into the orifice 29. A frusto-conical seating face 30 is in this chamber 25 commencing at the orifice 29 and diverging to the cylindrical wall 31 of the chamber 25.

A longitudinally segmented holding core 32 is disposed within the chamber for gripping the shank of the bolt when it is thrust into the drive nut. The holding core is formed as a plurality of segments which fit together to define a short, cylindrical member whose diameter is less than the diameter of the cylindrical wall 31 of the chamber wherein it is placed. This permits the segments to spread apart. An axially centered, threaded passageway 33 extends through this core to hold the threaded bolt shank B. A circumferential groove 34 about the face of the core carries a tightly fitted O-ring 35 to normally hold the segments together, but to permit them to spread apart to receive the bolt when it is thrust into the drive nut D.

The end of the chamber 25, opposite the face flange 27, is closed by a base 36 having a centered passageway through it and a frusto-conical projection 37 which is inclined substantially the same as the conical seating face 30. The end of the holding core, adjacent to the seating face 30, is formed as a cone 38 to fit the face 30 and the opposite end of the holding core is formed as a socket 39 to fit the conical projection 37. To keep the core from rotating within the body, the socket 39 and the projection 37 are notched to interlock the components together as best shown by notches 40 at FIG. 3.

The structure above described, as disclosed in my co-pending application, is self-operating. Whenever the drive nut is thrust upon the shank of a bolt, the pressure of the bolt threads against the threads of the core 32 within the chamber D will tend to spread the segment ends of the core adjacent to the bolt. At the same time, the conical sockets 39 at the opposite end of the core will engage and be pushed against the conical projection 37 on the base to cause the segments of the core to move along this projection 37 and to spread apart. The result is that the segments will remain substantially parallel as they are spread apart and once sufficient clearance is attained, the bolt will easily slip into the passageway 33. Thereafter, the drive nut may be tightened as with a wrench fitting the hexagonal outer wall 26. The holding core 32 will be rotated with rotation of the drive nut, and as it is tightened, this core will move downwardly along the shank of the nut until the conical projection 38 on the core tightly engages the conical seating surface 30 in the body of the nut, as best illustrated at FIG. 2.

In the improved construction herein disclosed, a quick connect nut N is provided which is essentially the equivalent of the holding core 32 above described. This quick connect nut is longitudinally segmented as at 42, and is formed with an axially centered, threaded passageway 43 through it. The outer face 44 is adapted to receive a wrench and is preferably hexagonal. One end of this nut is formed as a conical seat 45 to secure the nut in position upon a bolt. The other end of the nut includes a conical socket 46 to effect spreading as hereinafter described. The longitudinal segments of the nut are held together by a lock ring 47 fitted in a circumferential groove 48.

The construction shown at FIGS. 5 – 8 illustrates a nut N formed as two segments while the construction shown at FIG. 13 illustrates a nut N' formed of three segments as indicated at 42'. It is to be understood that the number of segments to be used is optional. It was found, from a manufacturing viewpoint, that a nut having two segments was preferred, but that the edge portions of the threads of each segment had to be flattened as at 49, to permit connection and disconnection of the nut from a bolt B by spreading the segments. This flattening of the edges of the threads leaves a full thread depth only at the center of each segment. However, tests indicated that a two-segment, segmented nut N will hold the bolt with an adequate degree of strength. Such flattening of the threads is not necessary if three or more segments are used.

The conical seat 45 of the nut N may be formed at any suitable angle, preferably 45°, and a washer 50 having a conical seat socket 51 of the same angle is used with this nut. Thus, when the nut and washer are fitted upon a bolt B, as shown at FIG. 5, the nut is tightened against the washer 50 so that the segments of the nut are tightly held in place. This washer seat 51 is equivalent to the conical seating surface 30 of the previously disclosed construction as illustrated at FIG. 2. It was found that when the segmented nut N was seated against the washer and tightened upon a bolt, the nut jammed tightly against the shank of the bolt to hold the same as a conventional nut. In fact, in a number of pull tests using a bolt and a steel, quick-connect nut N proportioned approximately to the proportions shown at FIG. 5, the bolt would invariably fail by pulling apart before threads of the nut would strip or the nut would otherwise fail.

Several modifications of this conical seat and socket are possible. Where it was desired to provide for an exceptionally tight fit, the conical seat of the nut Na, as shown at FIG. 14, may be formed as two segments 45a and 45b with the end segment 45a being formed as a frusto-cone having an inclination of approximately 45°, and the other segment 45b being a steep frusto-cone approaching a cylinder. A washer 50a, especially adapted to such a nut, includes a compound conical seat socket having segments 51a and 51b proportioned to tightly receive the conical seat 45a–45b.

Another modification concerns eliminating the washer 50 and countersinking a conical socket-seat 51c in the plate P whereagainst the nut is seated, as shown at FIG. 16. A further modification is illustrated at FIG. 17 where a conventional, oversized cut washer 52 is used, with the inside diameter of the cut washer being sufficiently great as to form a seat socket 51d and permit the conical seat 45 of the nut to bear against this washer to hold the segment in place. The pressure of the conical seat against the opening in the washer will cold flow the metal of the washer to form an adequate seat socket 51d.

The circumferential groove 48 about the body of the quick connect nut N will be of sufficient depth as to prevent the lock ring 47 within it from interfering with the placing of a wrench over the face of the nut. This lock ring 47 is preferably a small, steel spring wire which may expand wherever the segments of the nut are pulled apart, but which will otherwise hold the segments together. A rubber O-ring, such as heretofore described, may also be used for this purpose. A spring-wire washer of stainless steel or the like is preferred where the quick connect nuts are exposed to the elements or where they are to be put in storage for long periods of time.

The socket 46 at the end of the nut opposite the conical seat 45 is equivalent to the conical socket 38 of the previously disclosed construction illustrated at FIG. 2. It functions in the same manner, that is, to facilitate spreading the segments of the nut and holding them substantially parallel when the nut is thrust upon a bolt as illustrated at FIG. 12. To accomplish this, a thrust tool 55, as illustrated at FIG. 9, is required.

This thrust tool 55 is formed as a short, thick-walled tube proportioned for a convenient hand grip and its outer surface may be knurled to facilitate such gripping. The head end of this tool is formed with a cylindrical nut socket 56 to receive a nut N, the nut socket being oversized to permit the segments of a nut within it to spread apart. A resilient ring 57 is mounted within this socket to hold the nut in place, as shown at FIG. 11, and at the same time permit spreading as shown at FIG. 12.

The spreading of the nut N is accomplished by the combined action of the bolt bearing against the seat-end of the nut and of a frusto-conical base 58 within the tool socket 56 bearing against the socket 46 at the opposite end of the nut. The depth of the tool socket 56 is such that the inner end of the nut will bottom against this socket, as at 59, when the two segments of the nut are properly spread apart, as illustrated at FIG. 12. It is to be noted that the frusto-conical base 58 functions in the same manner as the conical projection 37 of the drive nut shown at FIGS. 2 and 3. To complete the tool, an axially centered passageway 60 extends through the body of the nut wherethrough the shank of a bolt may pass when the nut is thrust upon the bolt.

Figure 22:
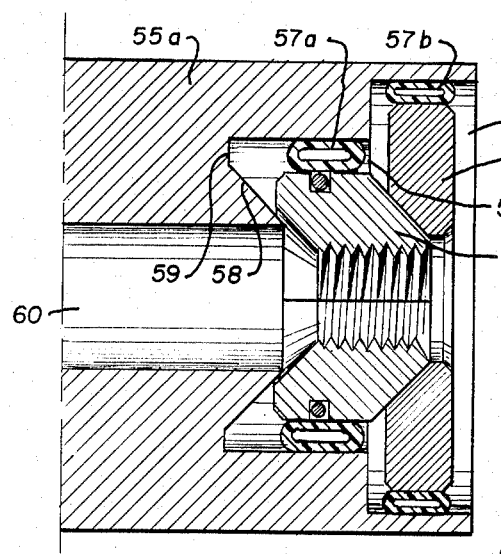
FIG. 22 is a sectional, fragmentary end detail similar to FIG. 11, but showing the tool modified by receiving a washer against the nut.

A variation of this thrust tool is shown at FIG. 22. The modified tool 55a is of a larger diameter and the socket includes two sections, a first section 56a to receive the nut N and a second, larger section 56b to receive the washer 50. The section 56a is the same as heretofore described, with a resilient ring 57a, a conical base 58, a bottom portion 59 and the passageway 60. The outer, larger section 56b is comparatively shallow and a resilient ring 57b is formed within it to hold the washer 50.

In use, the nut N is placed within the tool 55, or 55a, and simply thrust upon a bolt. When the nut is in place against a washer 50, the tool 55 may be turned to snug-up the nut, and thereafter, the tool is removed and the nut tightly fitted with a wrench in a conventional manner. It is to be noted that this nut can be fitted upon a bolt in a very short period of time and can be fitted upon bolts having threads which are mashed or otherwise damaged.

Figure 19:
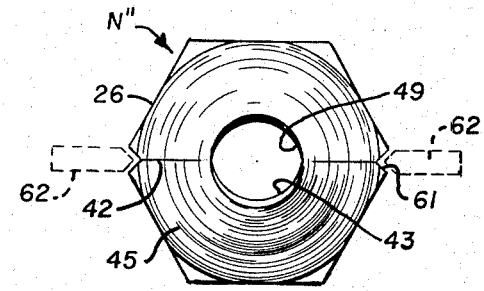
FIG. 19 is an end view of the nut shown at FIG. 18 with the ends of a spreading tool being shown in broken lines.
Figure 20:
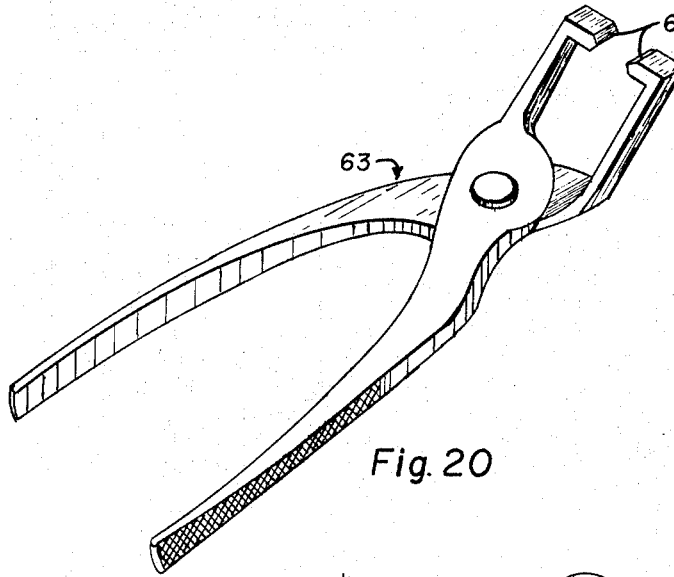
FIG. 20 is an isometric view of a spreader tool for the nut shown at FIGS. 18 and 19.
Figure 21:
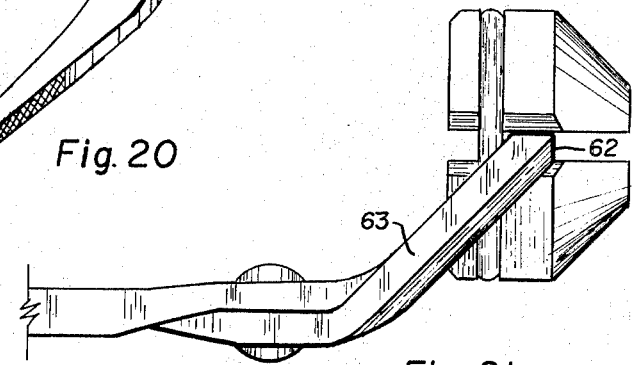
FIG. 21 is a side view of the nut shown at FIG. 18 and of a portion of the spreader tool spreading the same apart.

Removal of the nut N may be in a conventional manner as by turning the nut off a bolt as with a wrench. However, means may be provided for quick removal by spreading the segments of the nut, and this is especially expedient with a two-segment nut. A modified nut N'', as shown in FIGS. 18, 19 and 21, is used which includes a longitudinal groove 61 at the segment boundaries 42 at the hexagonal face 26 of the nut. Wedge-shaped gripper members 62 may be forced into the segment boundaries 42 to spread them, and such gripper members are indicated in broken lines at FIG. 19. The gripper members 62 may be mounted upon the jaws of a pair of pliers 63 as illustrated at FIGS. 20 and 21. Thus, after the nut is loosened from a seated position on a bolt, it can be quickly removed from the bolt with the gripper pliers.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

I claim:

1. A fitting tool for a quick-connect fastening device for attachment to a threaded bolt or the like for securing members together, said fastening device comprising:

a. a threaded nut having a generally cylindrical body divided longitudinally into a plurality of segments, with a threaded passageway sized for said bolt extending longitudinally therethrough and with wrench flats formed on the outer surface of said body whereby the nut may be turned with respect to said bolt, said body segments being held in juxtaposition by resilient retaining means disposed in a circumferential groove formed around said body outer surface whereby said segments may be spread apart to allow the nut to pass over a portion of the threads of said bolt without turning;

b. said body means further including a conical seat formed at one end of the body means for engaging a nut seating means, said conical seat being coaxial with said threaded passageway;

c. a nut seating means arranged to be disposed on the threaded bolt so that the seating means is between said nut and a member to be secured, said nut seating means including a member having an aperture extending therethrough, said aperture being sized to receive a portion of said conical seat, and having a seating surface arranged to mate with said body conical seat whereby as the nut is rotated on the threads of said bolt, the conical seat will be forced against the edge surface of said seating means causing the body segments to be held securely in position around said threaded bolt to provide a rigid fastening connection; and d. a conical socket at the end of the body opposite the conical seat, which is coaxial with the said threaded passage-way; and wherein said fitting tool is arranged to spread the body segments for inserting said nut over a portion of the threads of said bolt without nut rotation and said fitting tool includes a body having a frusto-conical projection formed at one end and a tubular bolt-receiving passageway extending inwardly from the said projection end and coaxial with said frusto-conical projection, said frusto-conical projection being insertable into said conical socket to spread the body segments.

2. In the device defined in claim 1, wherein: a socket is formed in the end of said tool having a diameter larger than the diameter of said nut body means with the inner edge of said socket contiguous with the base of said frusto-conical projection; and a resileint retaining ring positioned about the inner periphery of said socket whereby as the frusto-conical projection of said tool is inserted into the conical socket of said body means the body segments will be spread and held in the expanded position by the retaining ring.

3. A quick-connect fastening device as defined in claim 2, wherein:

said nut seating means is an oversized washer, and said fitting tool further includes a second socket sized to fit the outer diameter of said washer and arranged outward of said first socket, said second socket is provided with a second resilient retaining ring whereby the washer as well as the expanded nut may be retained in the fitting tool for insertion over the threaded bolt.

* * * * *